United States Patent
Branover et al.

(10) Patent No.: US 9,423,847 B2
(45) Date of Patent: Aug. 23, 2016

(54) METHOD AND APPARATUS FOR TRANSITIONING A SYSTEM TO AN ACTIVE DISCONNECT STATE

(75) Inventors: Alexander J. Branover, Chestnut Hill, WA (US); Krishna S Bernucho, Austin, TX (US); Maurice B Steinman, Marlborough, MA (US); Ming L. So, Danville, CA (US); Mom-Eng Ng, Austin, TX (US); Xiaogang Zheng, Sunnyvale, CA (US); Paul Blinzer, Bellevue, WA (US); Francisco L Duran, Austin, TX (US); Walter G. Fry, Houston, TX (US); Ali Ibrahim, Oakland, CA (US); Andrew W. Lueck, Austin, TX (US); Dan P Shimizu, Hillsborough, CA (US); Gary H. Simpson, Framingham, MA (US); Laura M. Smith, Lakeway, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1099 days.

(21) Appl. No.: 13/332,280

(22) Filed: Dec. 20, 2011

(65) Prior Publication Data

US 2013/0159750 A1   Jun. 20, 2013

(51) Int. Cl.
*G06F 1/32* (2006.01)

(52) U.S. Cl.
CPC ............ *G06F 1/3203* (2013.01); *G06F 1/3206* (2013.01)

(58) Field of Classification Search
None
See application file for complete search history.

(56) References Cited

U.S. PATENT DOCUMENTS

| 7,236,810 B1 * | 6/2007 | Underbrink et al. ........ 455/574 |
| 2009/0235105 A1 * | 9/2009 | Branover et al. ........... 713/330 |
| 2011/0264937 A1 * | 10/2011 | Meisner et al. ............ 713/323 |

* cited by examiner

*Primary Examiner* — Kim Huynh
*Assistant Examiner* — Vincent Chang

(57) ABSTRACT

A processor includes a processor core and a power management controller operable to receive a timer event, store the timer event, generate a hardware system sleep command to enter a hardware system sleep state, and restore the timer event upon exiting from the hardware system sleep state.

25 Claims, 4 Drawing Sheets

METHOD AND APPARATUS FOR TRANSITIONING A SYSTEM TO AN ACTIVE DISCONNECT STATE

CROSS-REFERENCE TO RELATED APPLICATIONS

Not applicable.

BACKGROUND

The disclosed subject matter relates generally to electronic devices having multiple power states and, more particularly, to a method and apparatus for transitioning a system to an active disconnect state.

The ever increasing advances in silicon process technology and reduction of transistor geometry makes static power (leakage) a more significant contributor in the power budget of integrated circuit devices, such as processors (CPUs). To attempt to reduce power consumption, some devices have been equipped to enter one or more reduced power states. In a reduced power state, a reduced clock frequency and/or operating voltage may be employed for the device.

For microprocessors, currently known Advanced Configuration and Power Interface (ACPI) and ACPI-based low-power states have been employed to reduce dynamic power consumption and reduce central processing unit (CPU) static power. ACPI is an open industry standard that defines common interfaces for hardware recognition, motherboard and device configuration, and power management. A widely recognized element of ACPI is power management—giving the operating system (OS) control of power management, in contrast with prior models where power management control was mainly under the control of the Basic Input/Output System (BIOS), with limited intervention from the OS. In ACPI, BIOS provides the OS with methods for directly controlling the low-level details of the hardware, providing the OS with nearly complete control over the power saving schemes.

The ACPI standard specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. C2 (often known as Stop-Clock state) is a state in which the processor stops clocks but maintains cache contents and all software-visible state data. Because cache contents are maintained in C2, the processor must still service coherency probes. C3 (often known as Sleep state) is a state in which the processor maintains cache contents and software state, but lowers voltage to a level sufficient to maintain the saved state. While the ACPI standard specifies 4 states (C0-C3), processors can have independently-defined hardware states beyond C3 representing progressively lower power states. Incremental improvements can be made by flushing cache contents so that the core no longer needs to participate in coherency probes (C5 state). The lowest power state is achieved when the processor cache contents and software context are saved and supply voltage is reduced to eliminate leakage. (C6 state).

On the system level, the APCI standard defines various system sleep states. The G0 (S0) state is the working state. G1 is a sleep state that is subdivided into the S1 state (all processor caches are flushed, and the CPU(s) stop executing instructions; power to the CPU(s) and RAM is maintained; devices that do not indicate they must remain on may be powered down), the S2 state (CPU powered off), the S3 state (commonly referred to as standby, sleep, or suspend to RAM; RAM remains powered), and the S4 state (commonly referred to as hibernation or suspend to disk; all contents of main memory are saved to non-volatile memory such as a hard drive, and is powered down). The G2 state, or S5 state similar to a G3 mechanical off state, but some components remain powered so the computer can "wake" from input from the keyboard, clock, modem, LAN, or USB device.

The S3 state is the lowest sleep state that maintains some functionality, such as memory state. The latency for returning from an S3 state is significantly less than that associated with the G2 or G3 states, which are considered long term sleep states. The S3 system sleep state is a conventionally controlled by the operating system. The wake up latency is on the order of a few seconds, but the ensuing re-establishment of network connectivity may last for minutes, thereby negatively impacting the end-user experience.

This section of this document is intended to introduce various aspects of the art that may be related to different aspects of the disclosed subject matter described and/or claimed below. This section provides background information to facilitate a better understanding of the different aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a processor. The processor includes a processor core and a power management controller operable to receive a timer event, store the timer event, generate a hardware system sleep command to enter a hardware system sleep state, and restore the timer event upon exiting from the hardware system sleep state.

Another aspect of the disclosed subject matter is seen in a computer system including a memory, a processor coupled to the memory, at least one timer operable to store a timer event, and a power management controller. The power management controller is operable to identify an idle state of the computer system, store the timer event, place the computer system into a hardware system sleep state responsive to identifying the idle state, and at least partially restore the computer system from the hardware system sleep state prior to the timer event.

Yet another aspect of the disclosed subject matter is seen in a method that includes receiving a timer event in a processor, storing the timer event, generating a hardware system sleep command in the processor to enter a hardware system sleep state, and restoring the timer event upon exiting from the hardware system sleep state.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
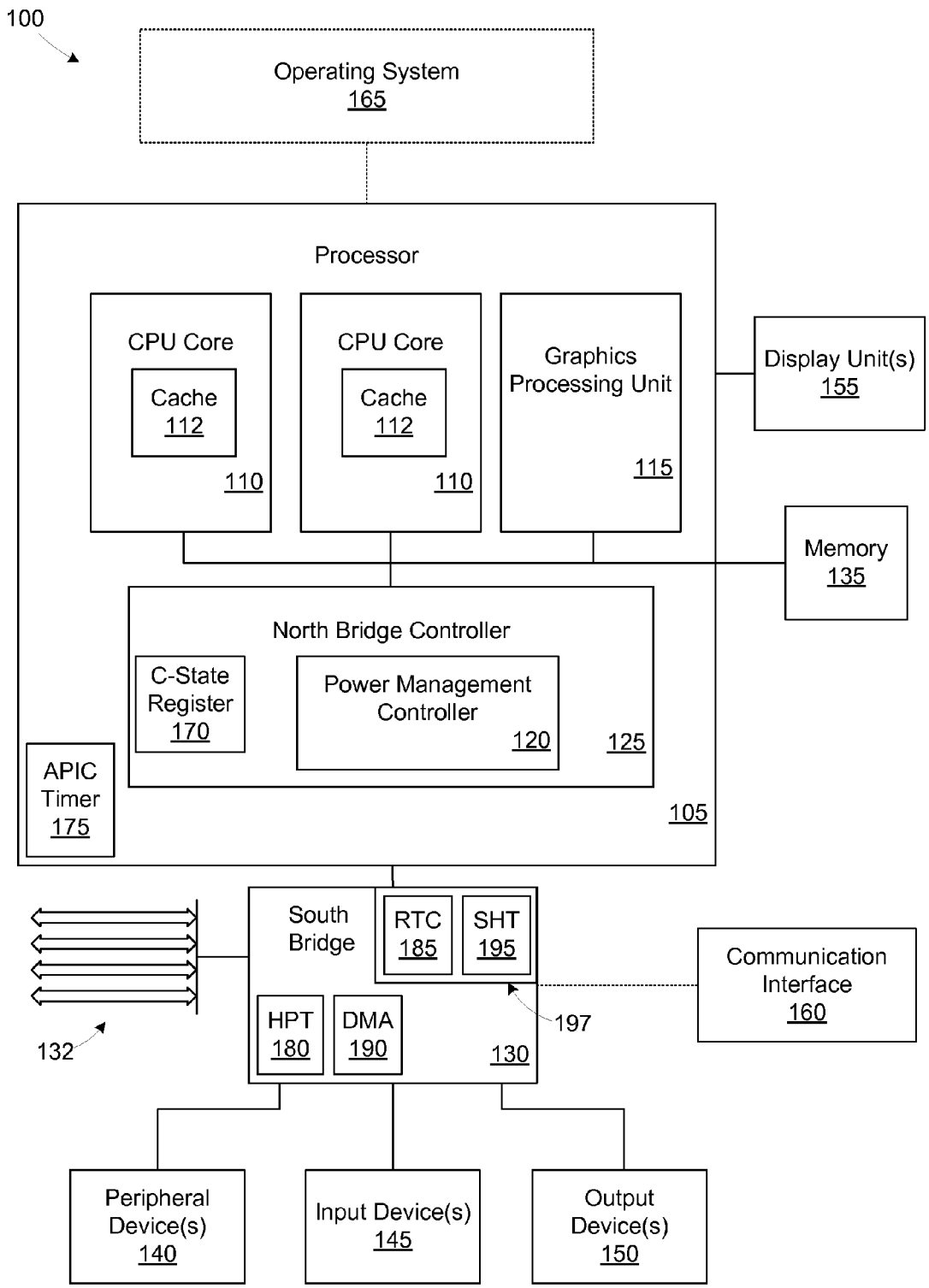
FIG. 1 is a simplified block diagram of a computer system having a power management controller operable to control transitions into a hardware system sleep state based on hardware activity.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100 including an accelerated processing unit (APU) 105. The APU 105 includes one or more central processing unit (CPU) cores 110, and their associated caches 112 (e.g., L1, L2, or other level cache memories), a graphics processing unit (GPU) 115, a power management controller 120, and a north bridge (NB) controller 125. The system 100 also includes a south bridge (SB) 130, and system memory 135 (e.g., DRAM). The NB controller 125 provides an interface to the south bridge 130 and to the system memory 135. To the extent certain exemplary aspects of the cores 110 and/or one or more cache memories 112 are not described herein, such exemplary aspects may or may not be included in various embodiments without limiting the spirit and scope of the embodiments of the present subject matter as would be understood by one of skill in the art.

In different embodiments, the computer system 100 may interface with one or more peripheral devices 140, input devices 145, output devices 150, and/or display units 155. A communication interface 160, such as a network interface circuit (NIC), may be connected to the south bridge 130 for facilitating network connections using one or more communication topologies (wired, wireless, wideband, etc.). It is contemplated that in various embodiments, the elements coupled to the south bridge 130 may be internal or external to the computer system 100, and may be wired, such as illustrated as being interfaces with the south bridge 130, or wirelessly connected, without affecting the scope of the embodiments of the present subject matter. The display units 155 may be internal or external monitors, television screens, handheld device displays, and the like. The input devices 145 may be any one of a keyboard, mouse, track-ball, stylus, mouse pad, mouse button, joystick, scanner or the like. The output devices 150 may be any one of a monitor, printer, plotter, copier or other output device. The peripheral devices 140 may be any other device which can be coupled to a computer: a CD/DVD drive capable of reading and/or writing to corresponding physical digital media, a universal serial bus ("USB") device, Zip Drive, external floppy drive, external hard drive, phone, and/or broadband modem, router, gateway, access point, and/or the like. To the extent certain exemplary aspects of the computer system 100 are not described herein, such exemplary aspects may or may not be included in various embodiments without limiting the spirit and scope of the embodiments of the present application as would be understood by one of skill in the art. The operation of the system 100 is generally controlled by an operating system 165 including software that interfaces with the various elements of the system 100.

The power management controller 120 may be a circuit or logic configured to perform one or more functions in support of the computer system 100. In the illustrated embodiment of FIG. 1, the power management controller 120 is implemented in the NB controller 125, which may include a circuit (or sub-circuit) configured to perform power management control as one of the functions of the overall functionality of NB controller 125. In some embodiments, the south bridge 130 controls a plurality of voltage rails 132 for providing power to various portions of the system 100. The separate voltage rails 132 allow some elements to be placed into a sleep state while others remain powered. For example, during an S3 system sleep state, the voltage rail 132 powering the memory 135 is active, but voltage rail 132 powering the processor 105 is powered down.

In some embodiments, the circuit represented by the NB controller 125 may be implemented as a distributed circuit, in which respective portions of the distributed circuit may be configured in one or more of the elements of the system 100, such as the processor cores 110, but operating on separate voltage rails 132, that is, using a different power supply than the section or sections of the cores 110 functionally distinct from the portion or portions of the distributed circuit. The separate voltage rails 132 may thereby enable each respective portion of the distributed circuit to perform its functions even when the rest of the processor core 110 or other element of the system 100 is in a reduced power state. This power independence enables embodiments that feature a distributed circuit, distributed controller, or distributed control circuit performing at least some or all of the functions performed by NB controller 125 shown in FIG. 1.

In the illustrated embodiment, the power management controller 120 receives C-state requests from the operating system 165, such as a halt state request (C1) or an IO C-state (C2). In other embodiments the operating system 165 may specify more than two processor states. The power management controller 120 applies the actual power actions to the processors. The power management controller 120 decides which of the states to implement based on factors such as interrupt rate, direct memory access (DMA) activity, etc. For example, the operating system 165 may request a sleep state, but the power management controller 120 may instead elect to place the processor in a halt state based on the system activity. Hence, if the power management controller 120 identifies a higher system activity, the shallower halt state is applied. Thus, the power state requested by the operating system 165 does not necessarily match the actual state of the processor core 110 that is implemented by the power management controller 120.

The power management controller 120 also controls the transitioning of the system 100 into a hardware system sleep state independent of the operating system 165. Conventional S3 states are controlled by the operating system 165. In the illustrated embodiment, the power management controller 120 implements an alternative hardware system sleep state, S0A3, that differs from the conventional S3 system sleep state in that both memory contents and communication connectivity are maintained during the alternative sleep state. This arrangement decreases the exit latency associated with the S0A3 state as compared to the conventional S3 state. The S0A3 hardware system sleep state is tailored for shorter duration sleep events than the conventional S3 sleep state. The S0A3 hardware system sleep state is hardware initiated by the power management controller 120, rather than being software initiated by the operating system 165 or other higher level power management software layer (i.e., which intended to be covered by the term operating system). The power management controller 120 issues a hardware system sleep state command to the other elements of the computer system 100, such as the south bridge 130, to place the system into the S0A3 state.

The power management controller 120 monitors hardware indicators indicative of system inactivity and transitions to the S0A3 hardware system sleep state without a direct request from the operating system 165. Upon returning from the hardware system sleep state, the power management controller 120 restores the system state such that the operating system 165 is not aware of the occurrence of the sleep state. Indications of inactivity that may be used by the power management controller 120 include timer activity, direct memory access (DMA) activity, I/O device status, CPU/GPU idle states, and operating system C-state requests.

Figure 2:
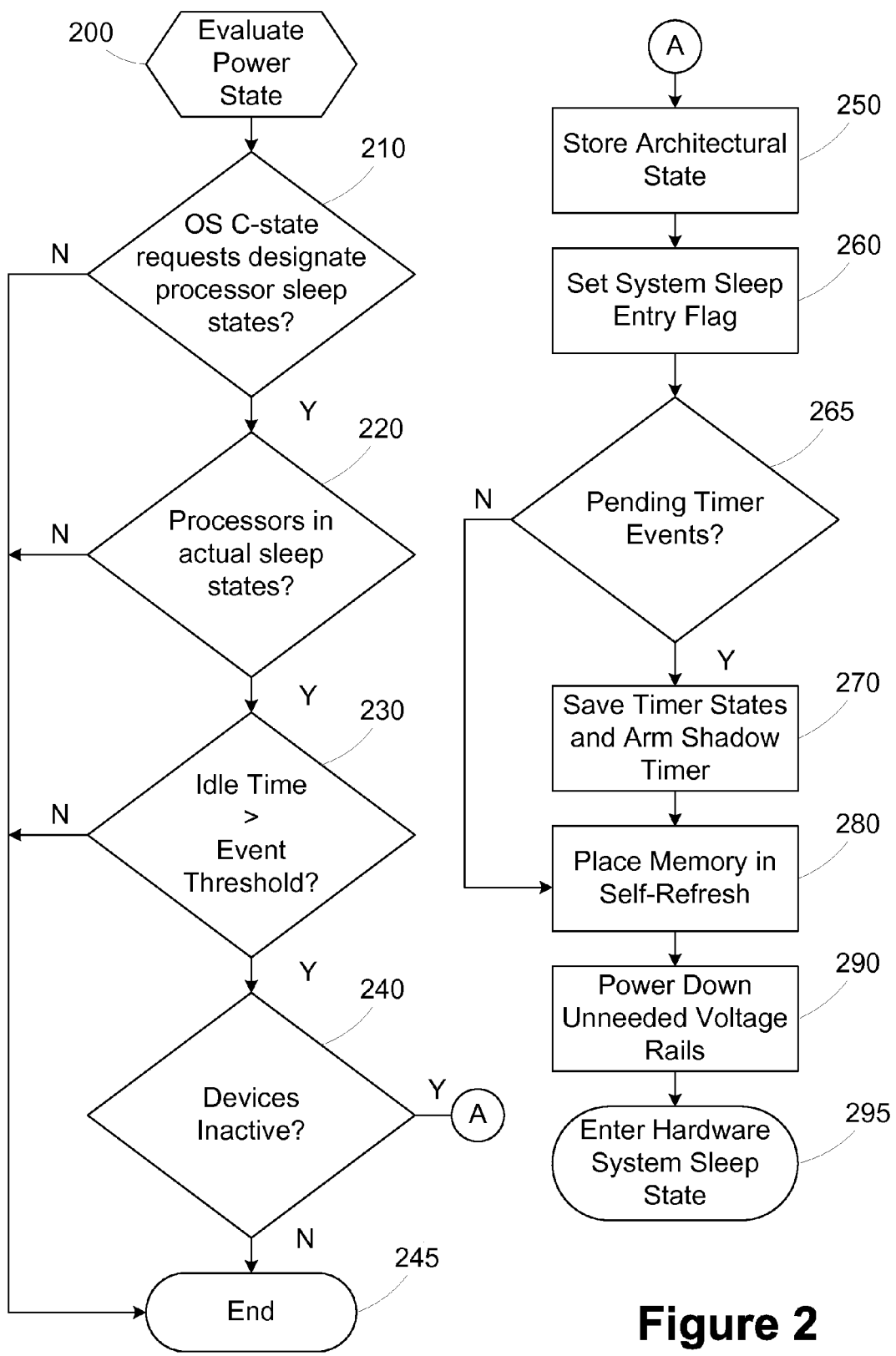
FIG. 2 is a simplified diagram of a method implemented by the power management controller of FIG. 1 to evaluate the feasibility of a hardware system sleep state.

Turning now to FIG. 2, a simplified flow diagram illustrating how the power management controller 120 evaluates system idleness is provided. In method block 200, the power management controller 120 initiates a reduced power state evaluation. In one embodiment, the power management controller 120 may periodically check to see if a lower power state can be entered, while in other embodiments, an event may trigger the reduced power state evaluation. For example, when a C-state request is received from the operating system 165, it may be a signal that the system is becoming idle. The power management controller 120 may thus evaluate the power state based on the receipt of a C-state request from the operating system 165.

In method block 210, the power management controller 120 determines if the operating system 165 (i.e., or other higher level power management software application) is in a state that would allow a hardware system sleep state to be entered by evaluating system C-state requests from the operating system 165. As described above, the operating system C-state requests may not necessarily match the actual states of the processors 115. A C-state register (or registers) 170 in the NB controller 125 indicates the requested C-state for each processor core 110. If the operating system 165 has requested C-states of C2 or deeper for each of the processors, the power management controller 120 determines that a hardware system sleep state is feasible from a system standpoint and continues to method block 220.

In method block 220, the power management controller 120 evaluates processor core 110 actual idle states to determine if they are currently in processor sleep states (e.g., C2 or deeper states). The power management controller 120 checks the actual states of the processor cores 110 to verify that they are all actually powered down, as compared to being in halt states. If the processor cores 110 are in sleep states, the power management controller 120 indicates that a hardware system sleep state is feasible from a processor core state standpoint and continues to method block 230.

An indication of system inactivity evaluated by the power management controller 120 is the status of one or more system wake-up timers. For example, the APU 105 uses a local advanced programmable interrupt controller (APIC) timer 175. The south bridge 130 implements one or more high precision timers (HPT) 180 and a real time clock (RTC) 185. Various system events may be scheduled based on the timers. Some timer events may be hardware controlled, while others may be implemented by the operating system 165. The application of the present subject matter is not limited to the particular timers 175, 180, 185 illustrated, as the system 100 may implement different or additional timers. The power management controller 120 evaluates the timers 175, 180, 185 and their associated events to determine the feasibility of transitioning to a hardware system sleep state. In method block 230, the power management controller 120 compares the idle time available until the next scheduled timer event to a predetermined event threshold. If the available event time is greater than the event threshold, the power management controller 120 indicates that a hardware system sleep state is feasible from an event standpoint and continues to method block 240.

In method block 240, the power management controller 120 uses DMA activity and device state other indications of system inactivity. In the illustrated embodiment, the south bridge 130 handles DMA requests. A DMA register (or registers) 190 logs DMA requests. The power management controller 120 reads the DMA register 190 and compares the time elapsed since the last DMA request was received by the south bridge 130 (i.e., DMA inactivity) to a predetermined activity threshold. In method block 240, the power management controller 120 may also poll devices to determine the device status to determine that the operating system 165 has placed the devices in a low power (e.g., non-D0) state. For example, the power management controller 120 may poll the south bridge 130, the NB controller 125, the GPU 115, etc., to determine if the devices are in inactive states. Alternatively, the power management controller 120 may track operating system, driver, or firmware requests to place the devices into low power states. If the devices are determined to be inactive based on DMA requests and/or device states in method block 240, the power management controller 120 indicates that a hardware system sleep state is feasible from a device activity standpoint and continues to method block 250 to initiate a hardware system sleep state.

In some embodiments, the checks to validate an S0A3 hardware system sleep state entry may vary. For example, not all of the checks illustrated in FIG. 2 may be performed, and/or additional checks may be added. The order of the checks may also vary. If the checks fail in method blocks, 210-240, the power state evaluation terminates in method block 245.

In method block 250, the power management controller 120 stores the architectural state (e.g., the registers and other structures that need to be saved for the APU 105 (CPU and GPU registers) and other elements of the system 100) in the memory 135 or other memory area that is on-volatile or remains powered during the sleep event, and an S0A3 entry flag is set in method block 260. The particular data structures that need to be saved to preserve the architectural state are known to those of ordinary skill in the art, so they are not described in detail herein. The S0A3 entry flag may be distinguished from an S3 entry flag that may be set if the operating system 165 triggers an S3 system sleep. The S0A3 entry flag may be stored in a non-volatile memory area, such as in the south bridge 130. The different system sleep entry flags for S0A3 and S3 system sleep states allow different entry and exit paths to be followed for the different system sleep modes.

In method block 265, the power management controller 120 determines if there are any pending timer events. If there are timer events, the power management controller 120 saves the timer states to the memory 135 and arms a shadow timer 195 in an always-powered portion 197 of the south bridge 135 in method block 270. For example, the value of the APIC timer 175 and/or the high precision timer(s) 180 may be saved. Typically, the RTC timer 185 is in the always-powered portion 197, so its contents need not be saved. The power management controller 120 uses the shadow timer 195 so that the hardware system sleep state can be exited prior to the time required to service an event specified by the saved timer events. For example, if the APIC timer 175 specified that a wake-up event was to occur in 200 ms, the power management controller 120 enters the sleep state and exits the sleep state so that the system is again operational prior to the 200 ms time period elapsing. If there are no timer events pending in method block 265, the power management controller transitions to method block 280.

In method block 280, the memory 135 is placed in a self-refresh state, and in method block 290, the voltage rails 132 not needed during the S0A3 hardware system sleep are powered down by the south bridge 130. The particular voltage rails 132 that may be powered down are known to those of ordinary skill in the art, so they are not described in detail herein. The voltage rail 132 for the memory 135 is maintained, and the voltage rail 132 needed to support connectivity (e.g., powering the communication interface 160 or NIC) is also maintained.

The hardware system sleep state is entered in method block 295. The particular amount of time spent in the hardware system sleep state and the power savings realized depend on the length of the idle time window, the entry and exit times, and a margin to avoid missing events.

Figure 3:
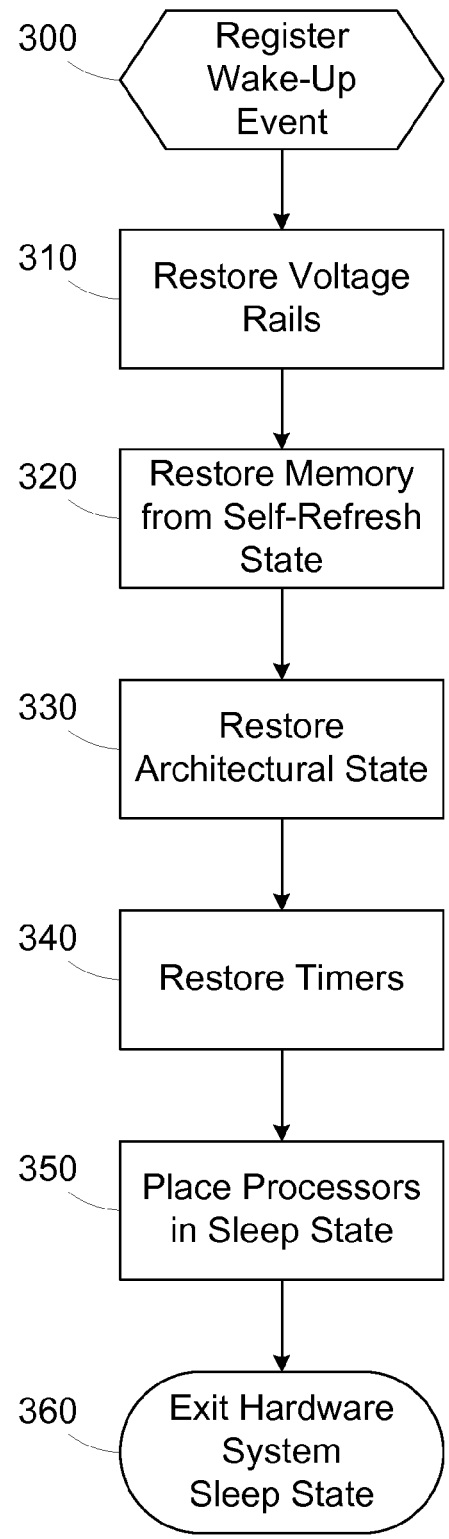
FIG. 3 is a simplified diagram of a method implemented by the power management controller of FIG. 1 to exit a hardware system sleep state.

Turning now to FIG. 3, a simplified diagram illustrating the S0A3 hardware system sleep exit path is illustrated. In method block 300, a wake-up event is registered. A wake-up event may be triggered based on the shadow timer 195. Other wake-up events may include a power button event, an incoming message over the communication interface 160, a low battery event, etc.

In method block 310, the voltage rails 132 are restored by the south bridge 130. Access to the memory 135 is restored and the memory 135 is transitioned out of the self-refresh state in method block 320. In method block 330, the architectural state (APU 105 registers, south bridge 130 data registers and/or other structures that were stored) is restored, and in method block 340, any saved timers 175, 180 are restored. The processors 110, 115 are placed or maintained in a sleep state (e.g., CC6) in method block 350 and the power management controller 120 enables the NB controller 125 to service interrupts. The sleep state is terminated in method block 360 after all the structures have been restored and are ready for service. When releasing the sleep state, the power management controller 120 enables the APIC functionality by enabling IOAPIC, or external APIC to allow the interrupt associated with the wake-up event to be serviced.

In another embodiment, the APU 105 and south bridge 130 may use explicit handshake messages to handle the timer or other wake-up event by enabling one of the processors 110 to handle the event without fully restoring the system. For example, if the wake-up event is an incoming message that needs to be stored in the memory 135, the power management controller 120 can implement a partial restoration to enable a processor 110 to store the data and then return to the hardware system sleep state. At a later time, either due to a timer event that requires the entire system to be restored to service the event or a different wake-up event, a full restoration of the architectural state may be completed and the instruction pointer of the latest task executed in the system may be provided to the operating system 165 or other higher level software. In either technique, the timer event is serviced in a manner such that, from the perspective of the operating system 165, operation resumes as if the sleep event had not occurred. The operating system 165 does not see that the system 100 ever left the active S0 state. Due to the low latency of the hardware system sleep state, power savings are achieved without negatively impacting the user experience. Time-stamp counters (i.e., located in the NB controller 125 and used by the operating system 165 or other higher level software for tracking wall time) are restored on exit by adding an elapsed time (i.e., time spent in the S0A3 state) to the time-stamp saved during the entry. In other words, New Time-Stamp value=Saved Time-Stamp value+time-residency in S0A3. In the illustrated embodiment, the value of the time-residency in S0A3 may be calculated using the RTC 185 or SHT 195.

Figure 4:
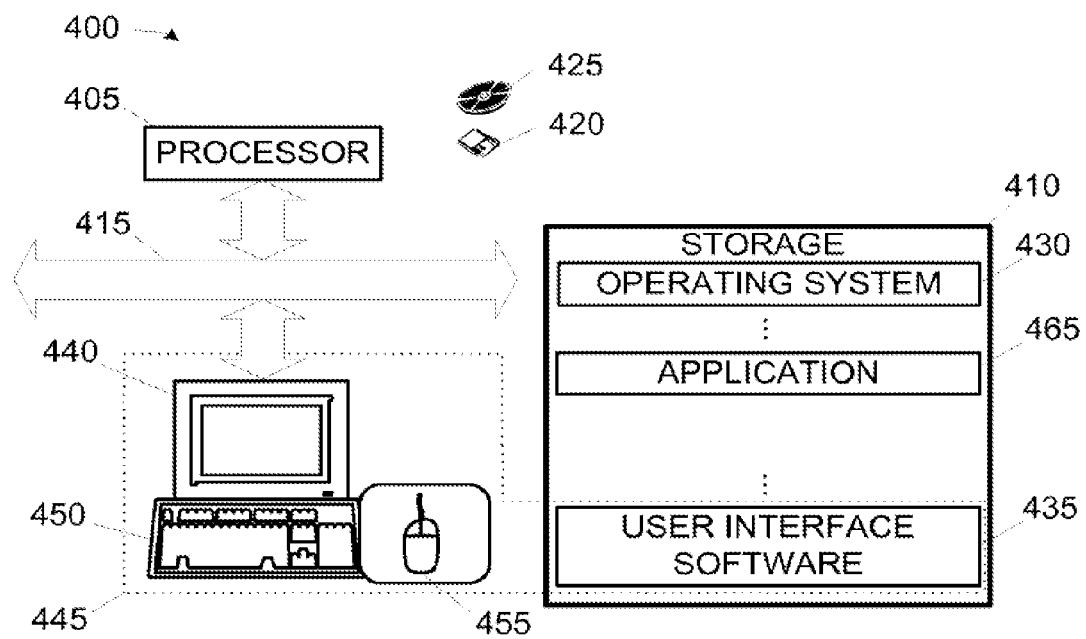
FIG. 4 is a simplified diagram of a computing apparatus that may be programmed to direct the fabrication of a processor in the system of FIG. 1.

FIG. 4 illustrates a simplified diagram of selected portions of the hardware and software architecture of a computing apparatus 400 such as may be employed in some aspects of the present subject matter. The computing apparatus 400 includes a processor 405 communicating with storage 410 over a bus system 415. The storage 410 may include a hard disk and/or random access memory ("RAM") and/or removable storage, such as a magnetic disk 420 or an optical disk 425. The storage 410 is also encoded with an operating system 430, user interface software 435, and an application 465.

The user interface software 435, in conjunction with a display 440, implements a user interface 445. The user interface 445 may include peripheral I/O devices such as a keypad or keyboard 450, mouse 455, etc. The processor 405 runs under the control of the operating system 430, which may be practically any operating system known in the art. The application 465 is invoked by the operating system 430 upon power up, reset, user interaction, etc., depending on the implementation of the operating system 430. The application 465, when invoked, performs a method of the present subject matter. The user may invoke the application 465 in conventional fashion through the user interface 445. Note that although a stand-alone system is illustrated, there is no need for the data to reside on the same computing apparatus 400 as the application 465 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 410, disks 420, 425, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 400, and executed by the processor 405 using the application 465, which may then control, in whole or part, the operation of a semiconductor manufacturing facility (or fab) to create semiconductor products and devices. For example, in one embodiment, silicon wafers containing a processor 105 of FIG. 1 may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A computer system, comprising:
    a processor;
    at least one timer operable to store a timer event;
    a power management controller operable to identify an idle state of the computer system, store the timer event, place the computer system into a hardware system sleep state responsive to identifying the idle state including placing the at least one timer into the hardware system sleep state, and at least partially restore the computer system from the hardware system sleep state prior to the timer event; and
    a south bridge coupled to the processor and operable to access a memory using direct memory access requests, wherein the power management controller is operable to identify the idle state by comparing a time period since a last direct memory access request to a predetermined activity threshold, and identify the idle state responsive to the time period not violating the predetermined activity threshold, and wherein the power management controller is operable to arm a shadow timer in the south bridge and use the shadow timer to exit the hardware system sleep state prior to a time required to service the timer event.

2. The system of claim 1, wherein the power management controller is operable to partially restore the computer system to allow the processor to service the timer event and subsequently return the computer system to the hardware system sleep state.

3. The system of claim 1, wherein the processor is operable to execute an operating system, and the power management controller is operable to place the computer system in the hardware system sleep state independently of the operating system.

4. The system of claim 1, wherein the timer comprises a local advanced programmable interrupt controller timer in the processor.

5. The system of claim 1, further comprising a south bridge coupled to the processor, wherein the timer comprises a high precision timer in the south bridge.

6. The system of claim 1, wherein the power management controller is operable to identify the idle state by comparing a time period prior to the timer event to a predetermined threshold, and identify the idle state responsive to the time period not violating the predetermined threshold.

7. The system of claim 1, wherein the power management controller is operable to identify the idle state by determining that the processor is in a sleep state and the processor has been powered down.

8. The system of claim 1, wherein the processor is operable to execute an operating system, and the power management controller is operable to identify the idle state by determining that the operating system has requested that the processor be placed in a sleep state.

9. The system of claim 1, further comprising a plurality of voltage rails for powering the computer system, wherein the power management controller is operable to place the computer system into the hardware system sleep state by storing an architectural state of the computer system in a memory, place the memory in a self-refresh state, and power down at least a subset of the voltage rails.

10. The system of claim 9, further comprising a communication interface coupled to a selected one of the voltage rails, wherein the power management controller is operable to power the selected voltage rail in the hardware system sleep state.

11. The system of claim 1, wherein the power management controller is operable to restore the timer event to the timer upon restoring the computer system.

12. The system of claim 1, wherein the processor includes a plurality of processor cores.

13. The system of claim 1, wherein the processor includes at least one processor core, and a graphics processing unit.

14. A processor, comprising:
a processor core;
a power management controller operable to receive a timer event from a timer, store the timer event, generate a hardware system sleep command to enter a hardware system sleep state that places the timer in the hardware system sleep state, and restore the timer event upon exiting from the hardware system sleep state; and
a south bridge coupled to the processor and operable to access a memory using direct memory access requests, wherein the power management controller is operable to identify the idle state by comparing a time period since a last direct memory access request to a predetermined activity threshold, and identify the idle state responsive to the time period not violating the predetermined activity threshold, and wherein the power management controller is operable to arm a shadow timer in the south bridge and use the shadow timer to exit the hardware system sleep state prior to a time required to service the timer event.

15. The processor of claim 14, wherein the power management controller is operable to arm a shadow timer and use the shadow timer to exit from the hardware system sleep state prior to the timer event.

16. The processor of claim 14, wherein the power management controller is operable to enable the processor core to allow the processor to service the timer event and subsequently return to the hardware system sleep state.

17. The processor of claim 14, further comprising a timer operable to store the timer event.

18. The processor of claim 17, wherein the timer comprises a local advanced programmable interrupt controller timer.

19. The processor of claim 14, wherein the power management controller is operable to identify an idle state by comparing a time period prior to the timer event to a predetermined threshold, and identify the idle state responsive to the time period not violating the predetermined threshold.

20. The processor of claim 14, further comprising at least one processor core, wherein the power management controller is operable to identify an idle state by determining that the at least one processor core is in a sleep state and the at least one processor core has been powered down.

21. A method, comprising:
receiving a timer event from a timer in a processor;
storing the timer event;
generating a hardware system sleep command in the processor to enter a hardware system sleep state that places the timer in the hardware system sleep state;
identify an idle state by comparing a time period since a last direct memory access request to a predetermined activity threshold, wherein the idle state is identified responsive to the time period not violating the predetermined activity threshold;
arming a shadow timer;
exiting from the hardware system sleep state prior to the timer event based on the shadow timer; and
restoring the timer event upon exiting from the hardware system sleep state.

22. The method of claim 21, further comprising:
enabling a processor core in the processor to allow the processor core to service the timer event; and
subsequently returning to the hardware system sleep state.

23. The method of claim 21, wherein the processor further comprises a timer operable to store the timer event.

24. The method of claim 21, wherein the processor includes at least one processor core, and the method further comprises identifying an idle state by determining that the at least one processor core is in a sleep state and the at least one processor core has been powered down.

25. A computer readable storage device encoded with data that, when implemented in a manufacturing facility, adapts the manufacturing facility to create a processor, comprising:
a processor core;
a power management controller operable to receive a timer event from a timer, store the timer event, generate a hardware system sleep command to enter a hardware system sleep state that places the timer in the hardware system sleep state, and restore the timer event upon exiting from the hardware system sleep state; and
a south bridge coupled to the processor and operable to access a memory using direct memory access requests, wherein the power management controller is operable to identify the idle state by comparing a time period since a last direct memory access request to a predetermined activity threshold, and identify the idle state responsive to the time period not violating the predetermined activity threshold, and wherein the power management controller is operable to arm a shadow timer in the south bridge and use the shadow timer to exit the hardware system sleep state prior to a time required to service the timer event.

* * * * *